United States Patent [19]

Dill

[11] Patent Number: 5,097,325

[45] Date of Patent: Mar. 17, 1992

[54] CIRCULAR SCANNING SYSTEM FOR AN INTEGRATED CAMERA AND PANORAMIC CATADIOPTRIC DISPLAY

[75] Inventor: James M. Dill, Stuart, Fla.

[73] Assignee: EOL₀ Company, Inc., Fort Lauderdale, Fla.

[21] Appl. No.: 628,450

[22] Filed: Dec. 17, 1990

[51] Int. Cl.⁵ ............................................. H04N 7/00
[52] U.S. Cl. ................................ 358/87; 358/108; 358/209
[58] Field of Search ............... 358/87, 108, 112, 110, 358/103; 315/378

[56] References Cited

U.S. PATENT DOCUMENTS

| | | | |
|---|---|---|---|
| 4,246,603 | 1/1981 | Wolff | 358/87 |
| 4,613,898 | 9/1986 | Bagnall-Wild et al. | 358/87 |
| 4,977,323 | 12/1990 | Jehle | 250/332 |
| 4,982,092 | 1/1991 | Jehle | 250/332 |
| 4,985,762 | 1/1991 | Smith | 358/87 |
| 5,040,055 | 8/1991 | Smith | 358/87 |

FOREIGN PATENT DOCUMENTS 673737 3/1990 Fed. Rep. of Germany.

Primary Examiner—James J. Groody
Assistant Examiner—Tuan V. Ho
Attorney, Agent, or Firm—Oltman and Flynn

[57] ABSTRACT

A circular scanning system for an integrated camera and catadioptric display has a photon camera tube with a scanning beam, a pixel clock generator for generating a pixel clock signal, a clock dividing arrangement for generating beam rotation signals, and a ramp signal generator for generating a beam radius transversing ramp signal being synchronous with the beam rotation signals. It also has an arrangement for generating a beam angle step signal for moving said beam in alternating interlaced frames and can accommodate a plurality of viewing stations, each directed to viewing a selected section of the image.

12 Claims, 2 Drawing Sheets

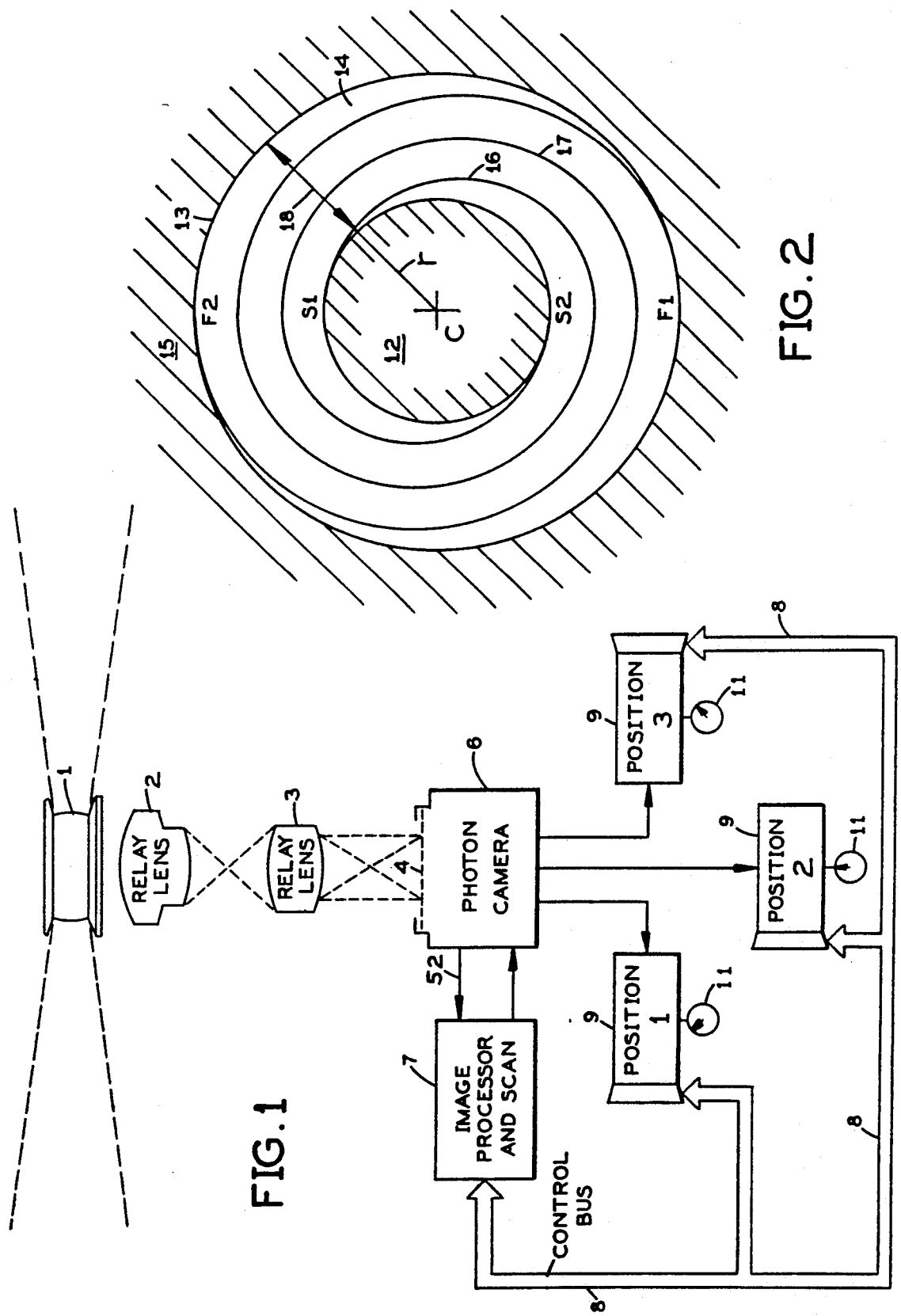

CIRCULAR SCANNING SYSTEM FOR AN INTEGRATED CAMERA AND PANORAMIC CATADIOPTRIC DISPLAY

The invention relates to a circular scanning system for an integrated photon camera and a catadioptric panoramic display.

BACKGROUND AND PRIOR ART

Panoramic catadioptric image systems are used to present panoramic views, and are used for example to give a tank crew a 360 degree view of a surrounding landscape.

The known catadioptric image systems suffer from a type of angular distortion commonly called "wheel spoke distortion", which results from the variable radius measured from the inner radius to the outer radius of the image. The spoke distortion can be corrected by means of sophisticated, expensive optical components. The optical correction of wheel spoke distortion, however, has proven not to be cost-effective, and therefore panoramic optical systems are advantageously of the time-share rotational type rather than static type. The present invention is based on electronic time-sharing.

It is an important drawback of the known systems that they are, for practical purposes, limited to a single viewing station, unless their construction is made considerably more complex.

It is accordingly an object of the instant invention to provide an improved panoramic imaging system which does not suffer from the drawbacks of the known panoramic imaging systems based on optical correction of the spoke wheel distortion.

SUMMARY OF THE INVENTION

In accordance with the invention, there is provided a circular scanning system for an integrated camera and catadioptric display, having a photon camera tube with a scanning beam, a pixel clock generator for generating a pixel clock signal, a clock dividing arrangement for generating beam rotation signals, a ramp signal generator for generating a beam radius traversing ramp signal being synchronous with the beam rotation signals, and means for generating a beam angle step signal for moving said beam in alternating interlaced frames.

According to a further feature there is provided a circular scanning system wherein said beam rotation signals include an arrangement for generating a sinusoidal vertical beam control signal and a sinusoidal horizontal beam control signal offset in phase 90 degrees from each other.

In accordance with a still further feature there is provided a circular scanning system wherein the arrangement for generating the beam angle step signal includes a selector switch in one of said vertical and horizontal beam control signals for introducing a 180 degree delay in a respective one of said vertical and horizontal beam control signals.

The invention may further include a video signal input, a random access memory having a digital input, and an analog-to-digital converter connected to the video signal input for digitizing the video signal and transmitting it to the random access memory, and a memory address counter having an input coupled to the clock dividing arrangement for generating successive memory addresses, and an output coupled to the random access memory.

According to still another feature, the invention includes at least one video position having an input coupled to an output of the random access memory, a digital-to-analog converter for converting a digital output signal from the random access memory to an analog video signal to be displayed at the video position. The video position may include a view angle counter coupled to an output of the clock dividing arrangement, a view gate coupled to an output of the view angle counter and having an output connected to the digital-to-analog converter for selecting a given view angle of the catadioptric display, and it may additionally include further a clock dividing means coupled to the first clock dividing means for generating a video camera blanking signal connected to the video camera tube, and a function generator and a frequency filter in the arrangement for generating the sinusoidal vertical beam control signal and in the arrangement for generating the sinusoidal horizontal beam control signal.

The circular scanning system according to the invention may further include a 90 degree phase shift circuit in the arrangement for generating a sinusoidal vertical beam control signal and a sinusoidal horizontal beam control signal for the purpose of shifting the phase of one of the sinusoidal beam control signals. The video position mentioned above may further include a raster display, which can be of the type using a CRT display, a liquid crystal display, a plasma display, an LED display, or any other suitable form of image display.

Further objects and advantages of this invention will be apparent from the following detailed description of a presently preferred embodiment which is illustrated schematically in the accompanying drawings.

BRIEF DESCRIPTION OF THE DRAWING

FIG. 1 is a block diagram of a panoramic catadioptric imaging system according to the invention, showing its major function blocks;

FIG. 2 is a diagrammatic representation of the scanning pattern of a photon camera of the invention.

DESCRIPTION OF THE PREFERRED EMBODIMENT

Figure 3:
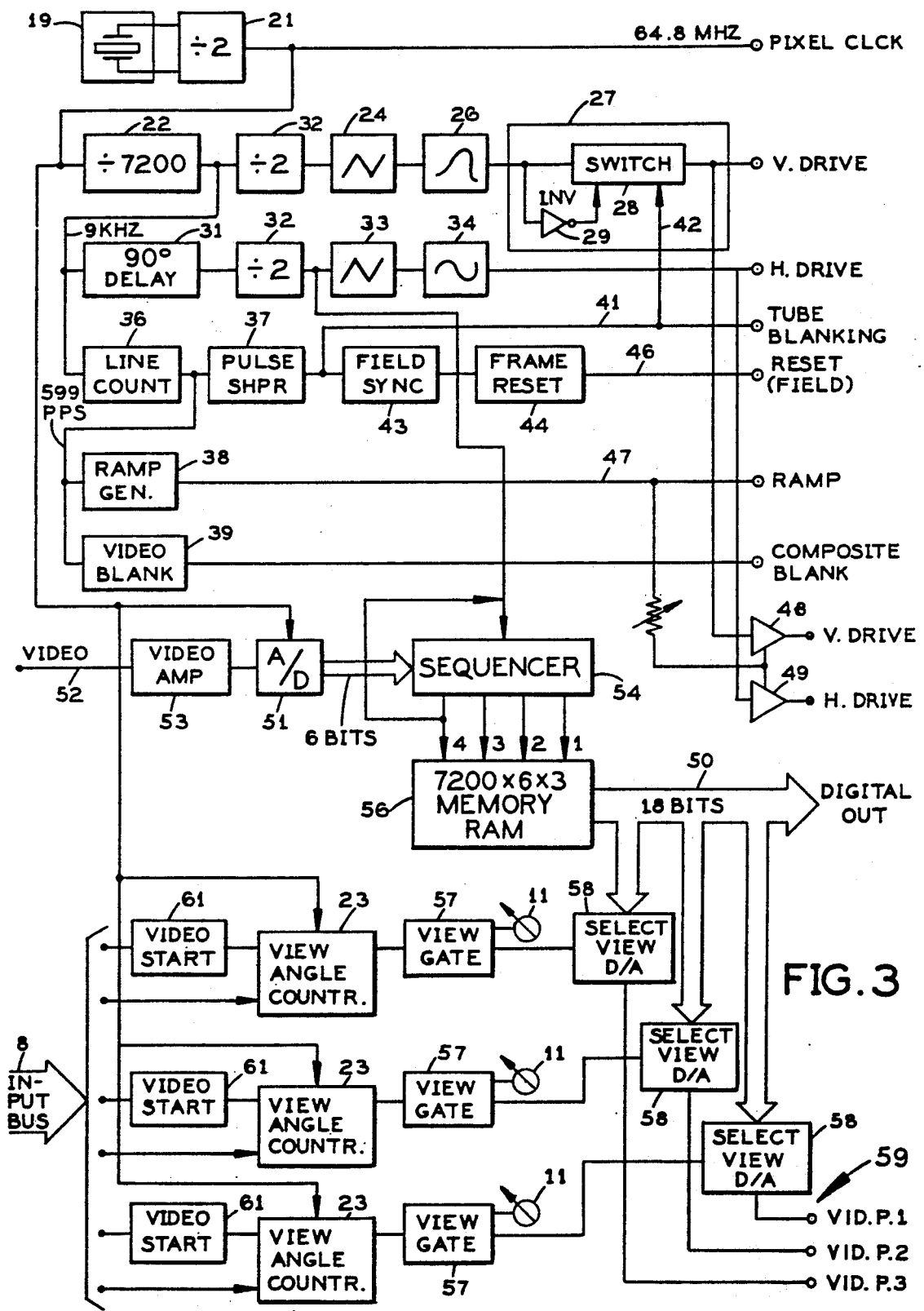
FIG. 3 is a schematic circuit diagram of the scanning section of the invention.

In FIG., 1 a panoramic lens 1 forms, through relay lenses 2 and 3, a real image on the imaging screen 4 of an electronic imaging camera 6. The camera may be any one of several types of electronic imaging devices known as vidicon or the like, having an image screen scanned by an electron beam controlled by a set of control electrodes that control the beam in a coordinate system described in the following as having a vertical and a horizontal axis, which is an arbitrary term as applied to the photon camera 6, but applies literally to the display positions 1, 2 and 3 which each shows an image having a vertical and horizontal axis.

The panoramic image on the image screen 4 is scanned by the image processor and scan circuit 7, which in turn transmits the scanned image as binary data on the control data bus 8, terminating at the display positions 9, of which three are shown. It follows that any number of display positions may be accommodated by the system as the particular application may require. As used for example in an army tank, one display position may be for example at the driver's seat, one position at the gunner's seat and one at the commander's seat.

The display positions 9 each displays an image in conventional, rectangular raster format, as known from television imaging. The image projected onto the image screen 4 is scanned in circular format in conformance with the panoramic shape of the image. The electronic conversion from circular format to raster format makes correction for the aforesaid wheel-spoke distortion which is the main drawback of the conventional optical imaging system.

Each display position 9 has an angle selector dial 11 that enables the operator to select any viewing angle segment of the panoramic image, as desired.

FIG. 2 shows in simplified form the scanning pattern of the image area according to the instant invention. The image area proper is the "doughnut-shaped" area 11, masked by an inner circular area 12 and an outer area 15 with an inner circular perimeter 13. The unmasked doughnut-shaped area 14 is scanned in two interlaced spiral-formed scans 16 and 17. The spiral scans 16 and 17 are drawn, for the sake of clarity, with much exaggerated steepness of the spirals. The spiral scan 16 is shown with an inner starting point S1, and the other spiral scan 17 is shown with an inner starting point S2. In the actual image it follows that many more revolutions will be required for each spiral scan. Typically each spiral scan will have 300 revolutions, interlaced with another spiral scan of 300 revolutions, for a total of 600 spiral lines in the complete image area.

As seen in FIG. 2, the two spiral scans 16, 17 are identical, except one is turned 180 degrees relative to the other, as shown by the angular distance of 180 degrees between starting points S1 and S2, and finish points F1, F2.

The image area 14 is typically scanned, as stated above, in alternating interlaced image fields. The interlacing of the image fields saves band width of the imaging system. A panoramic image in order to be effective must have a resolution of at least three (3) minutes of arc, in other words 1/20 of a degree of arc, which gives a total resolution of 360×20 pixels per revolution which equals 7200 pixels/line. Typically each image field has 300 lines at 30 fields per second, which gives a frequency of 7200×300×30, which equals a pixel frequency of 64.8 megaHerz (MHz). If the image frames were not interlaced, a pixel frequency of two (2) times 64.8 MHz would be required for a pixel frequency equal to 129.6 MHz, which would not be impossible, but not realistic or cost effective.

In a linear scan system, i.e. a raster scan, the horizontal flyback (retrace) would take 6-10% of the total frame time and thereby also increase the band width required. A circular scan system, as disclosed herein, for a panoramic imaging system does not require horizontal retrace, and therefore is not burdened with loss of time for this function, and the vertical retrace (in the radial direction) can be accomplished in much shorter time.

FIG. 3 is a block diagram of an exemplary scanning control for a panoramic scanning system as described above, showing further details.

In FIG. 3, a crystal generator 19 generates 129.6 MHz, which is divided by two in two-to-one divider 21, forming a pixel clock of 64.8 MHz. The pixel clock drives a 7200-to-1 divider 22, which also drives a plurality of view angle counters. The 7200-to-1 divider generates an output of 9 KHz, which drives the vertical (i.e. radial) drive system and also the circular drive system, and the line counter. In the vertical drive channel the 9 KHz clock is again divided in the two-to-one divider, which forms a square wave of 4500 Hz. The square wave is formed into a triangular wave shape in the pulse shaper, which is next formed into a sine wave in a filter circuit 26 which feeds one half of a selector switch 27, one half of which is switch 28, and the other half an inverter 29. The 9000 Hz clock also generates another train of the circular drive, which includes a ¼ cycle delay, i.e. a 90 degree delay circuit 31, followed by another 2-to-1 divider 32, feeding a triangle wave pulse shaper 33, which feeds another filter 34, that generates a sine wave, phase-shifted 90 degrees from the sine wave from filter 26. The two sine waves together, being offset 90 degrees, are respectively driving the vertical and horizontal deflection plates of the photon camera 6, and together create a rotating circular field that imparts a circular motion to the scanning beam of the photon camera 6. In order to generate the spiral motion of the beam, the 9 KHz from the 7200 to-1 divider 22 also feeds a line counter 36, which generates a 599 pulses per second signal, that feeds a pulse shaper 37, a ramp generator 38 and a video blanking former 39. The output of the pulse shaper 37 provides a tube blanking signal on lead 41 and reverses the selector switch output pulse on lead 42. The reversion creates a 180 degree phase delay, for each rotation of the scanning beam, which causes every second image scan to be offset 180 degrees, thereby creating the interlacing of the alternative odd and even image frames. The pulse shaper 37 generates the odd frame synchronizing drive, which is divided by two in the field sync circuit 43, and reformed in the frame reset circuit 44 to create a frame (and system) reset signal on lead 46. The line count signal of 599 pps drives the ramp generator 38 at the field input of the photon camera on lead 47 and the vertical and horizontal drive amplifiers which control the radial movement of the scanning beam under control of the ramp signal on lead 47, by controlling the amplitude of the two 90 degree offset sine waves from filters 26, 34 described above.

The line count output at 599 pps also drives the video blanking circuit 39 to develop blanking into a composite blanking signal.

The pixel clock of 64.8 MHz also provides gating for an analog/digital converter 51, which receives the video signal from the photon camera on lead 52, via video amplifier 53. The output of the A/D converter is a 6 bit binary word signal at a repitition rate equal to the pixel clock of 64.8 MHz, which is stored via a sequencer 54 in a random access memory (RAM 56) having a storage capacity of 7200×6×3 bits. The RAM 56 with the sequencer 54 maintains a running parallel record of the last three image frames, in order to allow the video positions 9 to display any selected segment of the video image. The bits in the RAM 56 are transferred into the memory via the leading edge of the pulses of the horizontal drive signal.

The video processor input bus 8 feeds a video start circuit 61, which keys each viewing channel with a view angle start signal derived by the external signals inserted at each monitor position 9 by means of the viewing angle selector 11, coupled to a view gate 57, which computes the pixel start point from which to read the RAM 56, representing the view angle. The selected view angle controls a selected view sector at the digital-to-analog converter 58 for each position, which in turn feeds the analog video information to the respective viewing position 9, via leads 59.

Three video positions 9 are shown. It follows that any number of video positions can be accommodated by equipping each position with the corresponding number of bits in the RAM 56 from 18 bit bus 50 and view gates 57, view angle counters 23 and video start circuits 61.

The geometric conversion of the circular image format from the circular scan of the photon camera to the undistorted raster format displayed on the video positions 9, takes place in each monitor so that the displayed video image represents the real world without distortion. In a second arrangement the main memory output bus 50 is connected to each monitor, each of which has a two line memory, the line of which is written into from the main bus and transferred to the second line for read-out. The A/D circuits are part of the monitor, and the video read rate is controlled by the main image processor 7, that will compute a read clock rate derived from the view angle selected from the respective monitor. The latter arrangement provides simplified monitor scanning so that a constant horizontal rate may be used at the monitor.

I claim:

1. A circular scanning system for an integrated camera and catadioptric display, comprising a photon camera tube; a scanning beam in said photon camera tube; scanning beam control means including a pixel clock generator for generating a pixel clock signal coupled to said scanning beam control means; clock dividing means coupled to said pixel clock generator for generating scanning beam rotation signals; a ramp signal generator for generating a scanning beam radius traversing signal being synchronous with said scanning beam rotation signals, and means for generating a scanning beam angle step signal for moving said scanning beam in alternatingly interlaced frames coupled to said scanning beam control means.

2. A circular scanning system according to claim 1, including means for generating a sinusoidal vertical beam control signal coupled to said pixel clock generator, and means for generating a sinusoidal horizontal beam control signal offset in phase 90 degrees from said sinusoidal vertical beam control signal coupled to said pixel clock generator.

3. A circular scanning system according to claim 2 wherein said means for generating a beam angle step signal includes a selector switch in one of said vertical and horizontal beam control signals for introducing a 180 degree step in a respective one of said vertical and horizontal beam control signals.

4. A circular scanning system according to claim 1, including a video signal input from said photon camera tube, a random access memory having a digital input, and an analog-to-digital converter connected to said video signal input for digitizing said video signal and transmitting it to said random access memory.

5. Circular scanning system according to claim 4, including a video start circuit coupled to said clock dividing means for generating a video start signal, a view angle counter coupled to said video start circuit for generating successive memory addresses, and view angle selection means including a view gate having an input connected to said view angle counter, a view angle selector having an output connected to said view gate for selecting a viewing angle, coupled to said random access memory.

6. Circular scanning system according to claim 4, including at least one video position having an input coupled to a digital output signal of said random access memory, and a digital-to-analog converter for converting said digital output signal from said random access memory to an analog video signal to be displayed at said video position.

7. Circular scanning system according to claim 6, including a view angle counter having an input, a video start circuit coupled to said input of said view angle counter, a view gate coupled to an output of said view angle counter, view angle selecting means coupled to an output of said view angle counter having an output connected to said digital-to-analog converter for selecting a given view angle of said catadioptric display.

8. Circular scanning system according to claim 1, including further clock dividing means coupled to said clock dividing means for generating a video camera blanking signal connected to said video camera tube.

9. A circular scanning system according to claim 2, including a function generator and a frequency filter in said means for generating a sinusoidal vertical beam control signal and in said means for generating a sinusoidal horizontal beam control signal.

10. A circular scanning system according to claim 9 including a 90 degree phase shift circuit in said means for generating a sinusoidal vertical beam control signal and a sinusoidal horizontal beam control signal for shifting the phase of one of said sinusoidal beam control signals.

11. A circular scanning system according to claim 6, including raster display means in said video position.

12. A circular scanning system according to claim 11, including at least one of a CRT-tube display, a liquid crystal display, a plasma display and an LED display in said raster display means.

* * * * *